United States Patent [19]

Staelin

[11] Patent Number: 4,822,145

[45] Date of Patent: Apr. 18, 1989

[54] METHOD AND APPARATUS UTILIZING WAVEGUIDE AND POLARIZED LIGHT FOR DISPLAY OF DYNAMIC IMAGES

[75] Inventor: David H. Staelin, Wellesley, Mass.

[73] Assignee: Massachusetts Institute of Technology, Cambridge, Mass.

[21] Appl. No.: 863,122

[22] Filed: May 14, 1986

[51] Int. Cl.$^4$ .................... G02F 1/13; F21V 7/04
[52] U.S. Cl. .................... 350/345; 350/334; 350/339 R; 350/338; 362/31
[58] Field of Search .............. 350/345, 338, 334, 345, 350/339 R; 362/31

[56] References Cited

U.S. PATENT DOCUMENTS

| | | | |
|---|---|---|---|
| 3,791,716 | 2/1974 | Borel et al. | 350/160 |
| 3,869,195 | 3/1975 | Aldrich et al. | 350/345 |
| 3,891,309 | 6/1975 | Bonne | 350/334 |
| 3,980,395 | 9/1976 | Giallorenzi et al. | 350/160 |
| 4,017,157 | 4/1977 | van Riet | 350/160 |
| 4,249,801 | 2/1981 | Masubuchi | 350/346 |
| 4,264,147 | 4/1981 | Baur et al. | 350/345 |
| 4,385,805 | 5/1983 | Channin | 350/334 |
| 4,642,736 | 2/1987 | Masuzawa et al. | 362/31 |

FOREIGN PATENT DOCUMENTS

| | | | |
|---|---|---|---|
| 0095327 | 6/1983 | Japan | 350/345 |
| 0189730 | 9/1985 | Japan | 350/334 |
| 2161969 | 1/1986 | United Kingdom | 350/345 |

OTHER PUBLICATIONS

R. F. Bush & P. E. Seiden, "Liquid Crystal Display Device", IBM Technical Disclosure Bulletin, vol. 14, No. 1, Jun. 1971.

G. Baur & W. Creubel, "Fluorescence-Activated Liquid Crystal Display", Applied Physics Letters, vol. 31, No. 1, Jul. 1st, 1977.

*Primary Examiner*—Stanley D. Miller
*Assistant Examiner*—Huy Kim Mai
*Attorney, Agent, or Firm*—Robert F. O'Connell; Robert M. Asher

[57] ABSTRACT

A visual display device is disclosed in which a liquid crystal cell is adjacent a light waveguide. Electrodes in the liquid crystal cell alter the dielectric constant therein to change the critical angle defined by the two media of the cell and the waveguide to regulate the amount and location of light which may escape from the waveguide. Color display can be obtained with visible light by providing a dyed layer and with ultraviolet light by providing colored ultraviolet phosphors. A shaped mirror or contoured reflective layer is provided with a visible light device to cause the displayed light to scatter in desired directions.

31 Claims, 1 Drawing Sheet

METHOD AND APPARATUS UTILIZING WAVEGUIDE AND POLARIZED LIGHT FOR DISPLAY OF DYNAMIC IMAGES

BACKGROUND OF THE INVENTION

This invention relates to the field of illumination and display devices, and more particularly to dynamic image displays.

Over the years, a variety of dynamic image display techniques have been developed, including the modulation of one or more flames, incandescent elements, electron-beam or ultraviolet-excited fluorescent patches, light emitting semiconductors, or other sources of light. Most of these techniques involve modulation of the power source responsible for the illumination of each picture element (pixel) in the image. Examples of these techniques include traffic lights, cathode ray tubes, and light emitting diode (LED) displays.

A second class of display techniques involves generation of light followed by its separate modulation for each pixel. An example of this is film projection where the image on the film selectively absorbs the light for each pixel, and the image changes as the film advances. The example most relevant to the present invention is liquid crystal displays which modulate ambient light to produce dynamic images for watch faces, computer displays and now even color television sets. In general, these techniques for producing compact flat displays are not economic or do not produce brilliant images.

In the field of data processing and communications, light waveguides have been used to guide coherent light. Information can be transferred by the use of switches such as the one disclosed by Giallorenzi et al. in U.S. Pat. No. 3,980,395. By selectively applying an electric field to liquid crystal cells, Giallorenzi can selectively couple or filter waveguide modes. This switch relies upon the phenomena of light by which a mode will only be coupled out of the guide when a liquid crystal's index exceeds the effective modal index. It is the object of the present invention to take advantage of this phenomena to provide a new and improved visual display.

It is the further object of the present invention to provide an improved method and apparatus for display of bright dynamic black and white or color images containing one or more pixels.

SUMMARY OF THE INVENTION

This invention is directed to a liquid crystal device for the display of dynamic light images. An array of liquid crystal cells are placed adjacent to a light waveguide. The dielectric constant of the cells and the dielectric constant of the waveguide together define a critical angle with respect to the normal to the surface; for angles of incidence above this critical angle light will remain trapped within the waveguide. Electrodes are provided for impressing a voltage across the liquid crystal layer to change its dielectric constant so that the critical angle is changed; this voltage controls the degree to which the trapped light from the waveguide can escape.

A number of methods have been devised for efficiently dispersing the escaped light to allow viewing of the display image from a wide range of angles. A shaped mirror may be placed within a liquid crystal cell to disperse the light. Alternatively, the liquid crystal cell may be placed on the viewing side of the display device and a grooved surface placed over the cell to disperse the light. According to another embodiment of the invention, ultraviolet light may be guided through the waveguide and controllably illuminate phosphors provided in the liquid crystal cells; these phosphors then disperse the resulting visible light.

Advantageously, the electric field impressed across a liquid crystal cell may be controlled to thereby control the degree of illumination provided by the liquid crystal cell. Furthermore, pigments, dyes, filters, or phosphors may be used to allow the production of color images.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
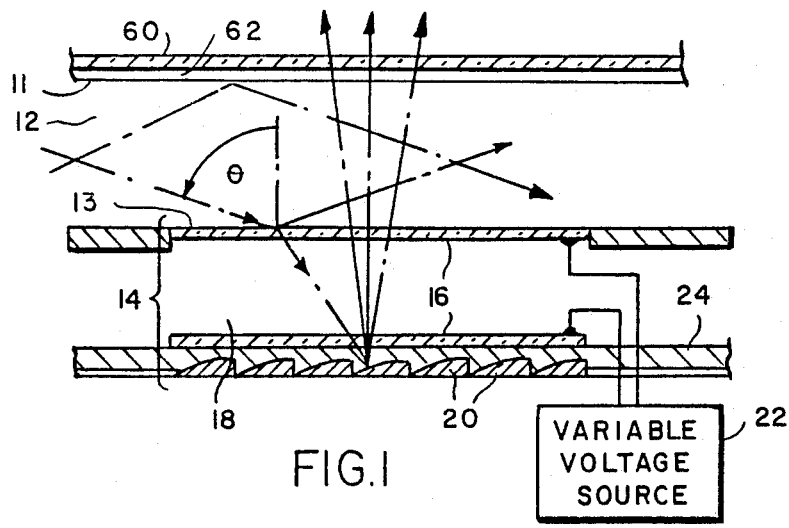
FIG. 1 is an illustration of a single liquid crystal cell of the present invention.

Turning now to the drawings, FIG. 1 shows a first embodiment of a liquid crystal cell of the present invention. Although only a single cell is shown, it is clear that any number of cells may be combined to form a display device which may be used in such applications as watches, meters, or television display screens. In the first embodiment, a light waveguide 12 carries light, typically incoherent white light, along the viewing side of the display. Adjacent to a rear face 13 of the light waveguide 12 is a liquid crystal cell 14. The cell 14 includes a pair of electrodes 16, a liquid crystal dielectric layer 18, an optional dyed layer 24 for imparting color, and a reflecting surface at the rear of the cell. The reflecting surface in this embodiment is a shaped mirror 20. In FIG. 1, the electrodes 16 are located on opposite surfaces of the liquid crystal dielectric layer 18 and are transparent and extremely thin so that light can escape from the optical waveguide 12 and pass through them on its trajectory toward the viewer.

Light remains trapped within the light waveguide 12 by means of the critical angle phenomenon. According to this phenomenon, when a uniform electromagnetic plane wave is incident upon a planar interface between dielectrics of permittivity $E_1$ and $E_2$, it will be totally reflected for angles of incidence $\theta$ which are greater than the critical angle $\theta_c$ measured in medium 1 as determined by the following formula:

$$\theta_c = \sin^{-1}[(E_2/E_1)^{\frac{1}{2}}], \text{ where } E_2 < E_1.$$

If the second medium has a thickness less than a few wavelengths of light then somewhat less than 100% of the incident energy with $\theta > \theta_c$ may be reflected.

Under normal circumstances, when a cell is not illuminated or "off", light is trapped within the light waveguide 12 and is not visible to the viewer. It is highly desirable that during manufacture the surface between the waveguide 12 and the liquid crystal 18 be carefully treated. First, surface effects and the perfection of the alignment of the crystals within one micron of the interface will largely determine the degree of Rayleigh scattering near the interface due to dielectric inhomogeneities small compared to a wavelength. Such scattering in the "off" or "dark" state of a cell must be minimized and will be a major factor in determining the image contrast ratio this invention can provide. Second, the degree to which this surface can pre-align the crystals in a desired way will partly determine the range of angles for light in the optical waveguide over which switching will occur; the larger this range the easier it is to obtain a desired surface luminosity with a given primary light source.

A variable voltage source 22 is provided for energizing the electrodes 16 to impress a voltage across the liquid crystal cell 14. The excitation used to alter the state of the liquid crystals usually is an alternating voltage of sufficient amplitude to reorient the crystals and of sufficient frequency to avoid churning the liquid crystal medium without being so high as to be ineffective. In a liquid crystal medium the dielectric constant, which is typically expressed as a matrix, depends upon applied electric fields. Thus, the variable voltage source 22 is used to vary the dielectric constant of the liquid crystal dielectric layer 18. Each pixel of an image in a display is created by a liquid crystal cell. Each cell has a liquid crystal layer characterized by a permittivity matrix representing the dielectric constant throughout the cell. The permittivity matrix is a function of the voltages applied across the liquid crystal and for many types of liquid crystal will not be a function of position within most of the cell; the surface-effect region can be made small by use of sufficient voltages. In the non-illuminated state, $E_2$ is somewhat less than $E_1$ so that the critical angle is typically in the range of 50°–87°.

Although there exist combinations of liquid crystals, waveguide materials, and angles of incidence in the waveguide which together permit operation with unpolarized light, (e.g. by using two liquid crystal states—one with the crystals aligned perpendicular to the interface, and the other with a random alignment) in general, the performance is superior if only one polarization of light is used, for then switching can be obtained for a larger range of incidence angles, thus facilitating achievement of greater luminances. For example, the modulation of effective $E_2$ is typically greater for guided TE waves than for TM waves for the case where the axes of the liquid crystals are alternatively perpendicular to the interface, or parallel to it and perpendicular to the plane of incidence.

A change of voltage across the liquid crystal cell can change the permittivity matrix and thus increase the critical angle, permitting light with an angle greater than the original critical angle to propagate through the liquid crystal medium to the shaped mirror 20. The mirror 20 is shaped in irregular fashion to disperse light back out through the display to the viewer with a desired angular distribution.

The voltage can be controlled to adjust the amount of light which is allowed to propagate out of the display. This control can be accomplished in the spatial or time domains. In the time domain one can simply control the duty cycle of the cell state so that the fraction of time in the "on" state is proportional to the desired intensity, and the switching rate is sufficiently high that there is no objectionable flicker, but sufficiently low that true switching can be achieved. Alternatively, a single control voltage can determine the fraction of the excited cell area which is in the on state. To accomplish this either the electric field strength acting on the crystals must vary over the area of the cell (which can be accomplished by varying the thickness of the liquid crystal dielectric layer over the cell area, or by making one electrode highly resistive so that the field strength is greatest at the end where the electrodes enter the cell, and weakest at the other end), or the field strength required to switch the crystal state must vary over the cell area (which can be accomplished by varying the cell surface treatment over the cell area).

It is possible to achieve a color display with the embodiment of FIG. 1 by providing a layer of dye 24 over the shaped mirror 20, by providing a layer of pigment in place of the mirror, or by placing a color filter over the viewing side of the liquid crystal display cell.

Figure 2:
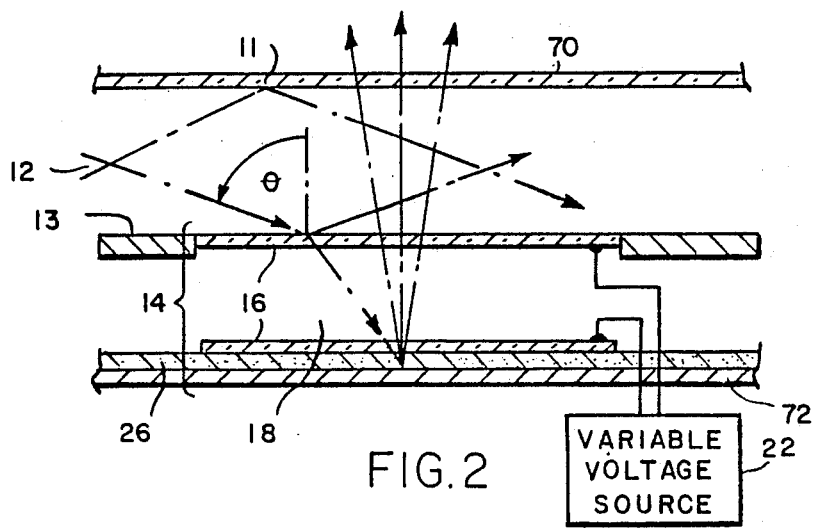
FIG. 2 is an illustration of a single liquid crystal cell of an alternate embodiment of the present invention.

The same basic principles are used in a second embodiment of the present invention display as shown in FIG. 2. In this embodiment, the light waveguide 12 carries ultraviolet light. Rather than a shaped mirror 20 and a dyed layer 24, the second embodiment uses a layer of ultraviolet phosphors 26 to color and disperse the resulting visible fluorescent light. When the appropriate voltage is applied across the liquid crystal cell, ultraviolet light is allowed through the liquid crystal layer where it illuminates the ultraviolet phosphors which fluoresce and disperse visible light through the viewing side of the display. A mirror may be provided behind the UV phosphors to increase the intensity of light directed toward the viewers. One difficulty in using ultraviolet (UV) light is that most liquid crystals are highly absorbing in this band, and therefore must be kept quite thin (perhaps 1–2 microns), even if carefully selected. The shorter UV wavelengths will typically scatter more strongly due to submicroscopic inhomogeneities in permittivity at the liquid crystal-waveguide interface, thus placing a greater premium on liquid crystal surface homogeneity.

Figure 3:
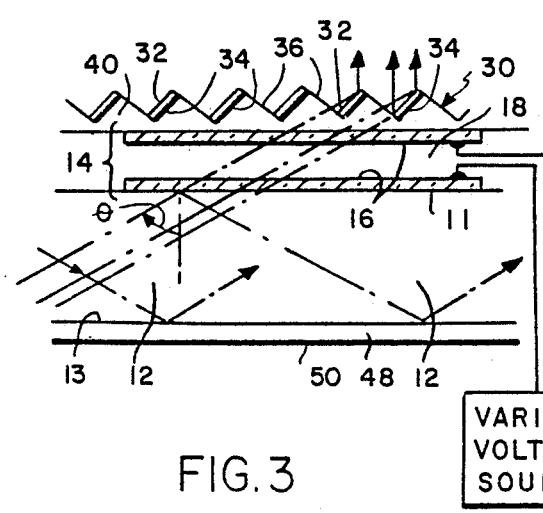
FIG. 3 is a depiction of a single liquid crystal cell of a third embodiment of the present invention.

It is also possible to rearrange the display device of the present invention as shown in FIG. 3. In this embodiment, the liquid crystal cell 14 is adjacent the front face 11 of the light waveguide 12. When the voltage allows propagation of light through the liquid crystal layer, it will continue out through the layer towards the viewer.

The efficiency of the light displayed by the liquid crystal device may be enhanced by providing a grooved viewing surface 30 over the liquid crystal cell 14. Since the only light allowed through the liquid crystal cell has an angle of incidence greater than the critical angle defined by the dielectric properties of the light waveguide 12 and the liquid crystal dielectric layer 18 in its off state, it is necessary to design the grooved viewing surface 30 so as to maximize the light that escapes toward the viewer. If the light waveguide 12 is propagating ultraviolet light, the grooved surface 30 may be replaced by a viewing surface provided with ultraviolet phosphors which disperse visible fluorescent radiation, much of which can escape.

The preferred grooved viewing surface 30 of FIG. 3 has two alternating types of surfaces. A mirrored surface 32 is provided at a first angle with respect to the normal to the display. Spread across the rear of the mirrored surface is a light absorbant layer 34. The light absorbant layer is preferably a black absorber. Alternating with the mirror/absorber combination is a plurality of transparent surfaces 36. The transparent surfaces 36 are tilted at a second angle from normal to the display so as to maximize the desired light emission. It is within the ordinary skill in the art to select the angles and shapes of these surfaces to achieve the desired display of light.

A layer of transparent material 40 fills the space between the irregular surface 30 and the liquid crystal cell 14. The permittivity of the material 40 would typically be equal to or greater than the permittivity of the liquid crystal cell in the "on" state to insure minimum energy loss at the boundary between the liquid crystal cell and the transparent material 40. The transparent material 40 can be an extension of the liquid crystal layer 18.

One advantage of the geometry of FIG. 3 is that the off state for a display cell can be made more nearly black by placing a black absorbing layer 50 adjacent the rear face 13 of the waveguide 12 for absorbing incident ambient light. The light absorbing layer 50 is separated from the light waveguide 12 by a gap 48. The gap 48 should be at least one . wavelength thick, and preferably several wavelengths to ensure that the evanescent wave produced in the gap is sufficiently attenuated at the absorbing surface so that negligible power is absorbed. Blackening the "off" state of a cell is also improved by the use of the light absorbant layers 34 behind the mirrored surfaces 32 and by providing anti-reflection transformer plates for use as the transparent surfaces 36. Furthermore, the angles of the mirrored surfaces 32 and transparent surfaces 36 can also be chosen to prevent or minimize the reflection of ambient light by the mirrored surfaces 32 toward the viewers. The spacing between the grooves in the viewing surface 30 should be larger than several wavelengths to minimize uncontrolled diffraction losses and edge scattering.

To improve the optical efficiency of a display device of the present invention, one may coat any partially reflecting surface with a thin anti-reflection dielectric transformer layer to maximize power transfer through the surface. There may also be reflections of room ambient light from the dyed layer 24 or the shaped mirror 20. These reflections can be reduced by employing an anti-reflection sheet 60 in front of the display as shown in FIG. 1 to trap and absorb reflected light. The anti-reflection sheet as it is known in the art includes a polarizing sheet and, parallel to it, a quarter-wave plate with axes at 45° to that of the polarizing sheet. The anti-reflection sheet is separated from the light waveguide 12 by a gap 62 of more than a wavelength so that coupling to the evanescent portions of the guided wave is negligible. The anti-reflection sheet 60 may also include anti-reflection dielectric transformers to reduce reflections.

Image contrast can be made high in the ultraviolet light source display device of FIG. 2 by providing an appropriate transparent ultraviolet absorbing material 70 which absorbs any scattered primary ultraviolet light while passing visible wavelengths. Many optically transparent materials have this property. If desired, the layer of UV phosphors 26 may be backed by a mirror 72 to enhance the absorption of UV light and emission of visible light. If the UV phosphor 26 and its mirror 72 reflect visible light from the environment, then an anti-reflection sheet 60 may be used as described above.

Figure 4:
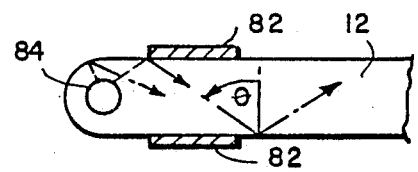
FIG. 4 is a diagram of a first embodiment of a light source for the present invention.
Figure 5:
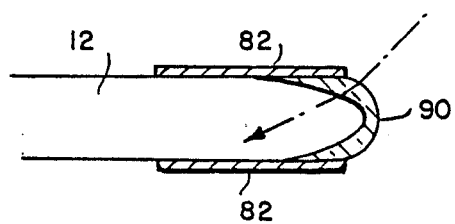
FIG. 5 is an alternate embodiment of a light source for the present invention.

Turning now to FIGS. 4 and 5, two alternative embodiments for light sources are illustrated. It is necessary that visible light or ultraviolet be provided to the display device of the present invention principally at angles greater than the minimum critical angle $\theta_c$. A simple angular filter having an appropriate length of absorber 82 on each side of the waveguide 12 to absorb light having an angle which is less than the minimum critical angle will achieve the desired angular distribution of light within the waveguide. The light source 84 in the embodiment of FIG. 4 could be a linear filament light bulb or a thin fluorescent tube, for example. In FIG. 5, an alternate embodiment of a light source makes use of ambient light by directing it into waveguide 12. A well known cylindrical lens 90 can be used with absorber 82 to enhance the supply of light into the waveguide 12 at the desired angles.

Alternatively, mirrors rather than the lens 90, may be used to increase the light delivered to the waveguide 12 within the desired angular range. The light sources may be positioned around the entire periphery of the liquid crystal display or only around a part of it.

It is desirable to leave adequate reflecting space between the pixels of a display and to choose a sufficient thickness for the optical waveguide 12 so that much of the primary illumination is allowed to propagate across the display even at full display brilliance. The parameters should be chosen so that the illumination introduced at the edges is not absorbed before reaching the center of the display. Another less desirable method for avoiding loss of illumination in the center of a display is to dynamically correct for this effect: however, this would require image dependent computations and the use of variable control of pixel luminance. A simple form of image dependent computation could also be used to modulate dynamically the primary illumination source so that its power is proportional to the computed total image luminance. Illumination of the display from all four of its edges would also help preserve uniformity of illumination and reduce the need for dynamic compensation.

As used herein, a liquid crystal cell 14 may include a bistable cell. Certain liquid crystal cells are bistable, and can remain in either one of two stable configurations without excitation; transient excitations suffice to alter the system state in either direction. The present invention also encompasses the possibility that such a bistable liquid crystal could be used, with its attendant potential advantage of simplified control circuits.

Of course, it should be understood that various changes and modifications to the preferred embodiments described above will be apparent to those skilled in the art. For example, quarter-wave or multi-layer dielectric transformers can be fabricated on any combination of optical surfaces to improve the transmission characteristics for the visible light across those interfaces, and the same dielectric transformers could also be used, if desired, to color the light or to whiten it. Similarly the contours or color characteristics of the shaped mirrors or of any optical medium interposed in the light path can be chosen to yield any desired angular distribution or color of emitted light, provided that the propagation of light trapped in the optical waveguide remains under control of the liquid crystal cells. Furthermore, liquid crystal display cells with the same or different characteristics can be combined to yield arrays that display stationary or moving monochrome or color images of any desired size or shape, and such arrays can themselves be combined to yield still larger images. These and other changes can be made without departing from the spirit and the scope of the invention and without diminishing its attendant advantages. It is therefore intended that such changes and modifications be covered by the following claims:

I claim:

1. A visual display device having a viewing side, said device comprising:
   a light waveguide having a viewing face adjacent to the viewing side of said display device, and an oppositely located rear face;
   an array of liquid crystal cells adjacent to the rear face of said waveguide, each cell including a dielectric layer and a pair of electrodes on opposite faces of said layer, said dielectric layer having a dielectric constant to define a critical angle relative to the normal to said rear face such that above said critical angle light will remain trapped within said light waveguide; and
   means for changing the voltage level across any of said pairs of electrodes to change said critical angle so that light may escape from said light waveguide and through the liquid crystal cell between said pair of electrodes so as to be visible on the viewing side of said display device.

2. The visual display device of claim 1 further comprising means, located behind each of said liquid crystal cells, for dispersing said escaped light.

3. The display device of claim 2 wherein said dispersing means comprises a shaped mirror.

4. The display device of claim 3, further comprising a layer of dye adjacent said mirror for providing a color display.

5. The display device of claim 2 wherein said dispersing means comprises ultraviolet phosphors and said light trapped within said light waveguide is ultraviolet.

6. The display device of claim 1 further comprising a light source for supplying said light waveguide with light at an angle greater than a minimum critical angle.

7. The display device of claim 6 wherein said light source comprises means for directing ambient light into said light waveguide.

8. The display device of claim 7 wherein said directing means is a cylindrical lens.

9. The display device of claim 6 wherein said light source comprises a fluorescent bulb.

10. The display device of claim 6 wherein said light source includes means for supplying polarized light to said light waveguide.

11. The display device of claim 1 further comprising an antireflection sheet overlying the viewing face of said light waveguide.

12. A visual display device comprising:
    a light waveguide having a front face and a rear face;
    an array of liquid crystal cells overlying the front face of said waveguide, each cell including a dielectric layer and a pair of transparent electrodes on opposite faces of said layer, said dielectric layer having a dielectric constant to define a critical angle relative to the normal to said front face, said critical angle being the angle above which light will remain trapped within said waveguide;
    means for changing the voltage level across any of said pairs of electrodes to change said critical angle so that previously trapped light may escape said light waveguide through the liquid crystal layer between said pair of electrodes; and
    a grooved surface overlying said array of liquid crystal cells for directing said escaped light, said grooved surface having a plurality of transparent surfaces facing in one direction alternately positioned with a plurality or mirror surfaces facing in a second direction.

13. The display device of claim 12 wherein said mirror surfaces have a light absorbing layer on their rear side facing the light waveguide.

14. The display device of claim 12 wherein said plurality of transparent surfaces comprise anti-reflection transformer plates.

15. The display device of claim 12 further comprising a light absorbing layer separated by a gap from said rear face of said light waveguide.

16. The display device of claim 12 further comprising means for supplying polarized light to said light waveguide.

17. A visual display device comprising:
    a light source of ultraviolet light;
    a waveguide having a front face and a rear face, for guiding ultraviolet light from said light source,
    an array of liquid crystal cells overlying the front face of said waveguide, each cell including a dielectric layer and a pair of transparent electrodes on opposite faces of said layer, said dielectric layer having a dielectric constant to define a critical angle relative to the normal to said front face, said critical angle being the angle above which light will remain trapped within said light waveguide;
    means for changing the voltage level across energizing any of said pairs of electrodes to change said critical angle so that previously trapped light may escape said light waveguide through the liquid crystal layer between said pair of electrodes; and
    a layer of ultraviolet phosphors overlying said array of liquid crystal cells for producing visible light in response to said escaped ultraviolet light.

18. The display device of claim 17 further comprising a light absorbing layer separated by a gap from said rear face of said light waveguide.

19. A method for illuminating a visual display device comprising the steps of;
    providing a light waveguide and an array of liquid crystal cells adjacent said waveguide;
    directing polarized light through said waveguide at an angle such that said polarized light remains trapped within said light waveguide; and
    changing the voltage level across a pair of electrodes in at least one of said liquid crystal cells to change the dielectric constant of said at least one liquid crystal cells so as to release polarized light from said light waveguide so that it is visible through said at least one liquid crystal cells.

20. A visual display device comprising:
    a light waveguide;
    means for supplying polarized light to said light waveguide;
    an array off liquid crystal cells adjacent to said light waveguide, each cell including a dielectric layer and a pair of transparent electrodes on opposite faces of said layer, said dielectric layer having a dielectric constant to define a critical angle relative to the normal to a face of said layer, said critical angle being the angle above which said polarized light remains trapped within said light waveguide; and
    means for changing the voltage level across any of said pairs of electrodes to change said critical angle so that previously trapped polarized light may escape said light waveguide through the liquid crystal layer between said pair of electrodes.

21. The visual display device of claim 20 further comprising means for directing said escaped light.

22. The visual display device of claim 21 wherein said means for directing said escaped light comprises a grooved surface, adjacent to said array of liquid crystal cells opposite from said light waveguide.

23. The visual display device of claim 22 wherein said grooved surface comprises a plurality of transparent surfaces facing in one direction alternately positioned with a plurality of mirror surfaces facing in a second direction.

24. The visual display device of claim 23 wherein said mirror surfaces have a light absorbing layer on their rear side facing the light waveguide.

25. The visual display device of claim 23 wherein said plurality of transparent surfaces comprise anti-reflection transformer plates.

26. The visual display device of claim 21 further comprising a light absorbing layer separated by a gap from said rear face of said light waveguide.

27. The visual display device of claim 20 further comprising a light source for limiting the supply of light to said light waveguide to light having an angle greater than a minimum critical angle.

28. The visual display device of claim 27 wherein said light source comprises means for directing ambient light into said light waveguide.

29. The display device of claim 28 wherein said means for directing ambient light comprises a cylindrical lens.

30. A visual display device comprising:
a light waveguide;
an array of liquid crystal cells adjacent to said light waveguide, each cell including a dielectric layer and a pair of transparent electrodes on opposite faces of said layer, said dielectric layer having a dielectric constant to define a critical angle relative to the normal to a face of said layer, said critical angle being the angle above which light remains trapped within said light waveguide;
means for directing ambient light into said light waveguide and limiting the supply of said ambient light to light having an angle greater than a minimum critical angle;
means for changing the voltage level across any of said pairs of electrodes to change said critical angle so that previously trapped light may escape said light waveguide through the liquid crystal layer between said pair of electrodes; and
means for directing said escaped light.

31. The visual display device of claim 30 wherein said means for directing said escaped light comprises a grooved surface, adjacent to said array of liquid crystal cells opposite from said light waveguide.

* * * * *